Jan. 1, 1963 B. H. TONGUE 3,071,735
PHASE-SHIFT-REDUCING APPARATUS
Filed June 4, 1959
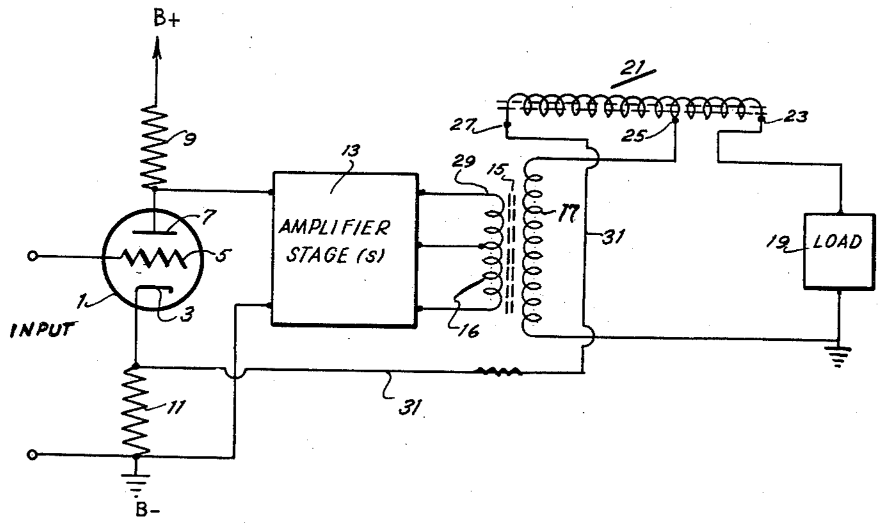
INVENTOR.
BEN H. TONGUE
BY Rines and Rines
ATTORNEYS United States Patent Office 3,071,735
Patented Jan. 1, 1963

3,071,735

PHASE-SHIFT-REDUCING APPARATUS

Ben H. Tongue, West Orange, N.J., assignor to Blonder Tongue Electronics, Newark, N.J., a corporation of New Jersey Filed June 4, 1959, Ser. No. 818,158
10 Claims. (Cl. 330—79)

The present invention relates to phase-shift-reducing apparatus and, more particularly, to apparatus for limiting the phase shift of a feed-back path from a transformer-fed load circuit to a maximum of substantially ninety degrees of phase shift.

There are many applications where it is desired to obtain a reference signal, the phase of which, at high frequencies, may differ from the phase at low frequencies by a maximum of ninety degrees, as contrasted with the one-hundred-eighty-degree phase shift that would be ordinarily produced in many systems provided with a resistive load, or the two-hundred-seventy-degree phase shift that would be produced with a capacitive load. In, for example, audio or other amplifying systems where the load is ultimately fed by an output transformer, the load appears to be driven by a complex impedance, one of the series elements of which is inductive; for example, the leakage inductance of the output transformer. In such circuits, inverse feedback is customarily provided from the load circuit to, for example, one of the preceding amplifier stages, in order to improve the linearity of the system and to reduce distortion. At the low audio frequencies, the various amplifier circuits and the output transformer produce relatively small phase shifts so that there is no problem of approaching substantially 180 degrees of phase shift in the inversely fed-back signals. At higher and higher frequencies, however, the resistance-capacitance coupled amplifier stages, as well as the output transformer, produce larger and larger phase shifts which may, in totality, approximate to 180 degrees of phase shift, thus rendering the system adaptable to oscillate when the loop gain approaches unity.

Various techniques, such as series resistance-capacitance networks shunted to ground, and the like, have been applied to various amplifier stages in an effort to keep down the phase shift produced thereby at the high frequencies. Phase-advancing impedances have also been connected in the reverse feed-back paths for the similar purpose of reducing the total phase shift of the energy fed back. If greater and greater feedback is desired, however, the phase shifts in the individual stages must be reduced further and further at the higher frequencies. If, moreover, a less costly transformer is to be employed, which is desirable for the manufacture of inexpensive equipment, more phase shift is generally produced at the higher frequencies because of the increased leakage inductance inherent in such transformers, so that additional precautions are necessary to keep down the overall phase shift.

An object of the present invention, however, is to permit the utilization, if desired, of such inexpensive transformers, or to permit the use of large feedback factors, or both, without introducing such phase-shift problems, through effectively limiting the phase shift introduced by the circuit connection to the load of the inverse feedback path to a maximum of ninety degrees, as compared with the maximal 180 degrees occurring with a resistance-loaded output transformer, and 270 degrees with a capacitive-loaded output transformer.

A further object is to provide a new and improved feedback circuit of more general utility.

Other and further objects will be explained hereinafter and will be more particularly pointed out in connection with the appended claims.

The invention will now be described in connection with the accompanying drawing, the single FIGURE of which is a partial block and schematic circuit diagram, illustrating the invention in preferred form.

For purposes of illustration, the invention will be described in connection with its important application to audio-amplifier systems, though it is to be understood that the invention is equally adaptable for use with other types of circuits and frequency range of alternating-current voltages, wherein the advantages of the invention are desired. A first amplifier stage is shown comprising a vacuum or electron tube 1 having a cathode 3, a control electrode 5 and a plate or anode 7, with plate voltage supplied through a plate load resistor 9 from the positive terminal B+ of a plate supply source, the negative terminal B— of which may be grounded, as shown. The input audio signal is applied at the input terminals between the control electrode 5 and the terminal B—, the cathode being provided with a cathode resistor 11, connected to the B— terminal. The output of this first amplifier stage 1 may be fed to conventional further amplifying stages 13, such as push-pull power amplifier stages, the output of which generally terminates in an output transformer 15. To this end, the primary winding 16 of the transformer 15 is shown connected in push pull to the output of the source of audio-frequency energy 1, 13, etc. The secondary winding 17 of the transformer 15 is connected to the ultimate load 19, such as a loudspeaker. As before stated, at the higher audio frequencies, the successive phase shifts produced in the stages 1, 13, etc., and in the transformer 15, cumulatively may approach 180 degrees. With sufficiently increased inverse feedback from the secondary winding 17 back to, for example, the amplifier stage 1, such that unity gain is approached or exceeded at 180° phase shift, the circuit will deleteriously tend to oscillate.

In accordance with the present invention, there is introduced in the output circuit, an autotransformer 21. The right-hand terminal 23 of the autotransformer 21 is shown connected to the upper terminal of the load 19. An intermediate terminal 25 of the autotransformer 21 is shown connected to the upper terminal or end of the secondary winding 17, so that the portion of the autotransformer winding 21 between the intermediate point 25 and the right-hand terminal 23 thereof, namely, the primary winding of the autotransformer 21, is connected to series circuit with the load 19.

The dimensions and number of secondary-winding turns to the left of the intermediate point 25, which is common to the primary and secondary autotransformer windings, is made such that the phase of the energy at the left-hand terminal 27 of the autotransformer 21 corresponds substantially to the phase at the upper terminal 29 of the primary winding 16 of the output transformer 15. The amplitude of the voltage at the terminal 27 of the autotransformer 21, however, will, of course, be less than that at the upper terminal 29 of the primary winding 16 of the output transformer 15. Energy that is fed back along a path 31 from the terminal 27 of the autotransformer winding 21 to the cathode 3 of the amplifier stage 1, thus has the same phase as that at the upper terminal 29 of the primary winding 16 of the output transformer 15. Had the feedback been taken from the terminal 29 of the primary winding 16 itself, of course, the distortion in the transformer 15 would not have been corrected, as before mentioned. By taking the feedback from the terminal 27 in the secondary-winding circuit, however, the distortion of the transformer 15, as well as that of the preceding amplifier stages 13, etc, is reduced.

The effective phase shift possible in this feedback path 31, moreover, is now limited to a maximum of 90 degrees. This is because the point 27 acts effectively as if it were the upper terminal 29 of the output of the amplifier 13, etc., and the maximum phase shift obtainable in an amplifier with a two-terminal load, is 90 degrees. Had the transformer 21 not been used, and had the secondary winding 17 been directly connected to the load 19, on the other hand, there could be produced a maximum phase shift of 180-degrees, if the load 19 were resistive, or a phase shift of 270-degrees, if the load 19 were capacitive. As before stated, such conditions may give rise to the tendency to oscillate and to the consequent limitation upon the magnitude of inverse feedback voltage usable with the circuit.

Further modifications will occur to those skilled in the art, and all such are considered to fall within the spirit and scope of the invention, as defined in the appended claims.

What is claimed is:

1. An electric system having, in combination, a source of alternating-current energy, an amplifier having an input connected to the source and an output, a load, an output transformer having a primary winding connected to the amplifier output and a secondary winding connected to the load, an autotransformer having primary and secondary windings each provided with a pair of terminals one of which is common to both windings, means for connecting the autotransformer primary winding in series circuit between the output transformer secondary winding and the load, and means for connecting the other terminal of the autotransformer secondary winding than the said common terminal to the amplifier input in order to feed back energy thereto, the autotransformer secondary winding being of sufficient number of turns and dimensions to establish at its said other terminal substantially the same phase of the energy as that appearing at the output transformer primary winding.

2. An electric system having, in combination, an amplifier source of alternating-current energy having an input and an output, a load, an output transformer having a primary winding connected to the amplifier output and a secondary winding connected to the load, a further transformer having primary and secondary windings each provided with a pair of terminals one of which is common to both windings, means for connecting the further transformer primary winding in series circuit between the output transformer secondary winding and the load, and means for connecting the other terminal of the further transformer secondary winding than the said common terminal to the amplifier input in order to feed back energy thereto, the further transformer secondary winding being of sufficient number of turns and dimensions to establish at its said other terminal substantially the same phase of the energy as that appearing at the output transformer primary winding.

3. An electric system having, in combination, a multistage amplifier source of alternating-current energy each amplifier stage of which is provided with an input and an output with successive stages coupled to one another by connection of the output of a preceding stage to the input of the next successive stage, a load, an output transformer having a primary winding connected to the output of the last amplifier stage of the source and a secondary winding connected to the load, an autotransformer having primary and secondary windings each provided with a pair of terminals one of which is common to both windings, means for connecting the autotransformer primary winding in series circuit between the output transformer secondary winding and the load, and means for connecting the other terminal of the autotransformer secondary winding than the said common terminal to the input of one of the stages of the amplifier source in order to feed back energy thereto, the autotransformer secondary winding being of sufficient number of turns and dimensions to establish at its said other terminal substantially the same phase of the energy as that appearing at the output transformer primary winding.

4. An electric system having, in combination, an amplifier source of audio-frequency energy having an input and an output, a load, an output transformer having a primary winding connected to the amplifier output and a secondary winding connected to the load, an autotransformer having primary and secondary windings each provided with a pair of terminals one of which is common to both windings, means for connecting the autotransformer primary winding in series circuit between the output transformer secondary winding and the load, and means for connecting the other terminal of the autotransformer secondary winding than the said common terminal to the amplifier source input in order to feed back energy thereto, the autotransformer secondary winding being of sufficient number of turns and dimensions to establish at its said other terminal substantially the same phase of the energy as that appearing at the output transformer primary winding.

5. An electric system having, in combination, a multistage amplifier source of audio-frequency energy each amplifier stage of which is provided with an input and an output with successive stages coupled to one another by connection of the output of a preceding stage to the input of the next successive stage, a load, an output transformer having a primary winding connected to the output of the last amplifier stage of the source and a secondary winding connected to the load, an autotransformer having primary and secondary windings each provided with a pair of terminals one of which is common to both windings, means for connecting the autotransformer primary winding in series circuit between the output transformer secondary winding and the load, and means for connecting the other terminal of the autotransformer secondary winding than the said common terminal to the input of one of the stages of the amplifier source in order to feed back energy thereto, the autotransformer secondary winding being of sufficient number of turns and dimensions to establish at its said other terminal substantially the same phase of the energy as that appearing at the output transformer primary winding.

6. An electric system having, in combination, a source of alternating current energy having an input and an output circuit, a load, an effective inductance interconnecting the source and the load, a further transformer having primary and secondary windings each provided with a pair of terminals one of which is common to both windings, means for connecting the further transformer primary winding in series circuit between the load side of the said effective inductance and the load, and means for connecting the other terminal of the further transformer secondary winding than the said common terminal to the source input circuit in order to feed back energy thereto, the further transformer secondary winding being of sufficient number of turns and dimensions to establish at its said other terminal substantially the same phase of the energy as that appearing at the source side of the said effective inductance.

7. An electric system having, in combination, an amplifier source of alternating current energy having an input and an output, a load, an effective inductance interconnecting the source output and the load, a further transformer having primary and secondary windings each provided with a pair of terminals one of which is common to both windings, means for connecting the further transformer primary winding in series circuit between the load side of the said effective inductance and the load, and means for connecting the other terminal of the further transformer secondary winding than the said common terminal to the amplifier source input in order to feed back energy thereto, the further transformer secondary winding being of sufficient number of turns and dimensions to establish at its said other terminal substantially the same phase of the energy as that appearing at the source side of the said effective inductance.

8. An electric system having, in combination, a multistage amplifier source of alternating current energy each amplifier stage of which is provided with an input and an output with successive stages coupled to one another by connection of the output of a preceding stage to the input of the next successive stage, a load, an effective inductance interconnecting the output of the last amplifier stage of the source and the load, an autotransformer having primary and secondary windings each provided with a pair of terminals one of which is common to both windings, means for connecting the autotransformer primary winding in series circuit between the load side of the said effective inductance and the load, and means for connecting the other terminal of the autotransformer secondary winding than the said common terminal to the input of one of the stages of the amplifier source in order to feed back energy thereto, the autotransformer secondary winding being of sufficient number of turns and dimensions to establish at its said other terminal substantially the same phase of the energy as that appearing at the source side of the said effective inductance.

9. An electric system having, in combination, an amplifier source of audio-frequency energy having an input and an output, a load, an effective inductance interconnecting the source output and the load, an autotransformer having primary and secondary windings each provided with a pair of terminals one of which is common to both windings, means for connecting the autotransformer primary winding in series circuit between the load side of the said effective inductance and the load, and means for connecting the other terminal of the autotransformer secondary winding than the said common terminal to the amplifier source input in order to feed back energy thereto, the autotransformer secondary winding being of sufficient number of turns and dimensions to establish at its said other terminal substantially the same phase of the energy as that appearing at the source side of the said effective inductance.

10. An electric system having, in combination, a multistage amplifier source of audio-frequency energy each amplifier stage of which is provided with an input and an output with successive stages coupled to one another by connection of the output of a preceding stage to the input of the next successive stage, a load, an effective inductance interconnecting the output of the last amplifier stage of the source and the load, an autotransformer having primary and secondary windings each provided with a pair of terminals one of which is common to both windings, means for connecting the autotransformer primary winding in series circuit between the load side of the said effective inductance and the load, and means for connecting the other terminal of the autotransformer secondary winding than the said common terminal to the input of one of the stages of the amplifier source in order to feed back energy thereto, the autotransformer secondary winding being of sufficient number of turns and dimensions to establish at its said other terminal substantially the same phase of the energy as that appearing at the source side of the said effective inductance.

References Cited in the file of this patent

UNITED STATES PATENTS

| | | |
|---|---|---|
| 1,519,211 | Martin | Dec. 16, 1924 |
| 1,946,047 | Van Der Pol | Feb. 6, 1934 |
| 2,212,850 | Tellegen | Aug. 27, 1940 |
| 2,255,679 | Riddle | Sept. 9, 1941 |
| 2,281,618 | Riddle | May 5, 1942 |
| 2,652,459 | White | Sept. 15, 1953 |
| 2,775,656 | Hounsfield | Dec. 25, 1956 |